April 18, 1961   W. HANDSCHIN   2,980,783
LIGHTING AND SIGNALLING INSTALLATION, IN
PARTICULAR FOR MOTOR VEHICLES
Filed Aug. 16, 1956   2 Sheets-Sheet 1
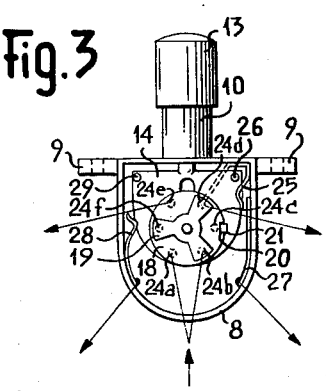
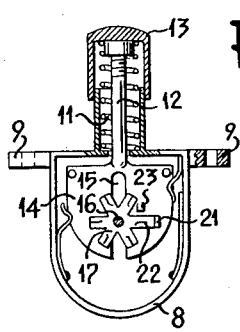
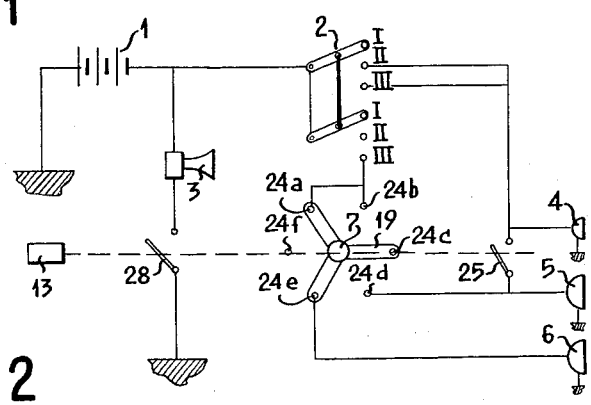
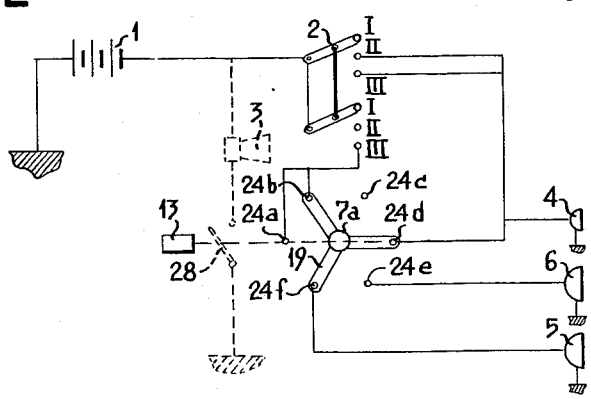
INVENTOR
WALTER HANDSCHIN

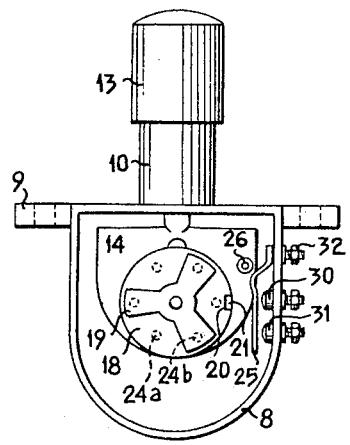
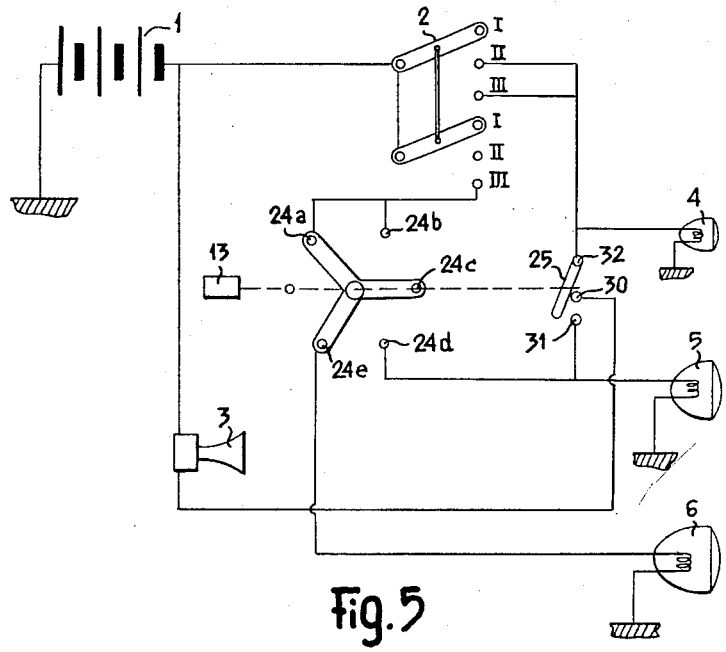

United States Patent Office 2,980,783
Patented Apr. 18, 1961

2,980,783

LIGHTING AND SIGNALLING INSTALLATION, IN PARTICULAR FOR MOTOR VEHICLES

Walter Handschin, Chemin du Cap 1, Lausanne, Switzerland

Filed Aug. 16, 1956, Ser. No. 604,512

2 Claims. (Cl. 200—156)

The object of the present invention is a lighting and signalling installation, in particular for motor vehicles, of the type comprising a source of electricity for supplying current to the parking lights (fender and rear lights), the headlamps and the anti-dazzle lamps (dipped or dimmed lights) at least, a hand switch with three positions corresponding as follows: the first to driving by day, the current being supplied to certain electrical apparatuses in the vehicle and in particular the horn, the second to driving by night in built-up areas, the current being supplied not only to the apparatuses supplied in the first position but also to the parking lights (fender and rear lights) and the third position to driving by night outside built-up areas, the current being supplied not only to the parking lights (fender and rear lights) but also either to the headlamps or the anti-dazzle lamps (dipped or dimmed lights), a foot switch being introduced into the circuit to make it possible to select either the headlamps or the anti-dazzle lamps (dipped or dimmed lights).

Installations of the type indicated above are already fitted quite commonly to a large number of motor vehicles. These installations however possess certain disadvantages from the point of view of signalling, particularly with regard to night driving.

There also exist other, more complete installations allowing other possibilities than those permitted with the installation of the type indicated above. These installations however consist as a general rule of relay controlled devices which are not completely reliable, or again of multiple switches fitted, for example, on the steering wheel, which result in a very complicated and tangled system of wiring in the steering column.

The installation forming the subject of this invention aims at overcoming the above-mentioned disadvantages. It is characterised by the fact that the foot switch comprises at least one extra contact, making it possible to select a signalling device with the foot even when the hand switch is in the second position.

The attached diagram shows by way of example three possible forms of execution of the installation forming the subject of the invention.

Fig. 1 is a diagram of the first form of execution.
Fig. 2 is a diagram of the second form of execution.
Fig. 3 shows a switch that could be used with either of the two forms of execution shown in Figs. 1 and 2.
Fig. 4 is a sectional view of the same switch.
Fig. 5 is a diagram of the third form of execution.
Fig. 6 shows a switch similar to that in Fig. 3, but slightly modified to enable it to be used with the third form of execution shown in Fig. 5.

The lighting and signalling installations shown in Figs. 1 and 2 both include a source of electric current, for example a battery 1, for supplying current to the parking lights (fender and rear lights), headlamps and anti-dazzle lamps (dipped or dimmed lights) at least.

A hand switch 2 with three positions is provided to make it possible to select different apparatuses to be supplied with current when driving by day or by night.

Position I of the switch 2 corresponds to driving by day, the battery 1 being capable of supplying current to certain electrical apparatus in the vehicle and in particular the horn 3. Position II corresponds to driving by night in built-up areas, the source of electricity 1 supplying current not only to the apparatus supplied in position I but also to the parking lights 4 (fender and rear lights). Position III corresponds to driving by night outside built-up areas, the battery 1 supplying current not only to the parking lights 4 but also either to the headlamps 5 or the anti-dazzle lamps 6 (dipped or dimmed lights).

A foot switch 7, of the rotary type, is introduced into the circuit to make it possible to select either the headlamps 5 or the anti-dazzle lamps 6.

In the two examples shown in the diagram, the foot switch has been taken to be of the rotary type. Figs. 3 and 4 show the details of the construction of such a switch.

As can be seen in these two figures, this switch consists of a body 8 forming a case, with two lugs 9 to enable it to be fittted onto the vehicle. This body 8 has a cylindrical extension 10 forming an integral part of it, in which a rod 12 bearing at one end an operating knob 13 is able to slide axially under the action of a spring 11. The other end of the rod 12 is connected to a pallet-shaped part 14 with a slit 15. An axle 16 is fixed transversely into the central part of the case 8 and engages in the slit 15 of part 14. A rotary part 17 in the shape of a six armed star is fixed on the axle 16. A disc 18 made of some insulating material is also fitted on in such a way that it can rotate round axle 16. On this disc 18 there is a small plate 19 in the shape of a star with three arms and made of a metal that is a good conductor of electricity. In this disc 18 there is a slot 20 in which a curved back portion 21 of an arm 22 of part 17 engages.

In addition a spring, not shown in the diagram, is fitted between parts 17 and 18 in order to hold them apart while at the same time leaving part 21 engaged in slot 20. Furthermore, a stop 23 is provided on part 14 to come up against the corresponding arm of part 17 when knob 13 is pressed down. When knob 13 is displaced the length of a normal run, the stop 23 turns parts 17 and 18 a sixth of a revolution; and when knob 13 is released, the spring 11 returns part 14 to its initial position without affecting parts 17 and 18. This controlled movement of parts 17 and 18 is carried out in the same way as that by a click device.

This switch also has a cover, not shown in the drawing, for closing the case 8 and holding in place the different rotary parts contained therein.

On this cover, which can be made entirely of some insulating material, are fixed six terminals 24a, 24b, 24c, 24d, 24e, and 24f, the positions of which are indicated by dots in Fig. 1. These terminals 24a, 24b, 24c, 24d, 24e, and 24f are used for the various connections of the switch, which can be supplied with current each time part 19 comes in contact with the respective terminals 24a, 24b, 24c, 24d, 24e, and 24f.

The switch shown in Figs. 3 and 4 possesses, in addition to the contacts that ordinary switches of this type are equipped with, two extra contacts of the return-spring type. As a matter of fact a sprung segment 25 is fitted in the case 8 and connected electrically to terminal 24d.

Part 14 also has an insulated finger 26 intended to bear upon this sprung segment 25 at the beginning of the run of the knob 13 so as to establish a contact between the segment 25 and a segment 27 fixed in the case 8 but insulated electrically from it. The second extra contact consists of a sprung segment 28 forming part of the case 8 but insulated electrically from it. Part 14 has a finger 29 for making contact with segment 28 at the end of the run of knob 13. As this finger 29 is not insulated, it earths the conductor connected to segment 28 when it makes contact with this segment.

A switch similar to that represented in Figs. 3 and 4 has been shown in very diagrammatic form in Fig. 1. The same reference numbers of the principal parts of this switch have moreover been repeated in Fig. 1.

As shown in Fig. 1, the extra contact formed by segment 28 has been used to work the horn 3. Thus, as shown in the diagram, horn 3 can be operated in any one of the three positions of switch 2 by pushing down to the fullest extent on the operating knob 13 of switch 7.

The extra contact containing segment 25 is connected so as to make it possible in position II of the hand switch 2 to supply current to the headlamps 5 for the purpose of optical signalling. When switch 2 is in position II, the parking lights 4 are on. It is sufficient therefore to press lightly on knob 13 with the foot to close the contact 25 which allows current to be supplied to the headlamps 5. As contact 25 has not actually beam switched on, it is possible to flash headlamps 5 rapidly on and off with the foot.

In position III switch 2 makes terminals 24a and 24b of switch 7 live. It is possible therefore, in this position III of switch 2, to select either the headlamps 5 or the anti-dazzle lamps 6 by pressing normally on knob 13 so as to turn parts 17, 18 and 19 and thus bring one of the arms of part 19 into contact either with terminal 24d (headlamps 5), or with terminal 24e (anti-dazzle lamps 6).

In position III of the hand switch 2, even though the anti-dazzle lamps 6 have been selected, it is possible by pressing lightly with the foot on knob 13 to close the return-spring contact 25 so as to supply current to the headlamps 5 form the circuit supplying the parking lights 4. In this way it is possible to make the headlamps 5 flash rapidly on and off.

In the form of execution shown in Fig. 2, the lighting and signalling installation consists of the same parts 4, 5 and 6 and the same hand switch 2 with three positions.

However, the foot switch 7a is somewhat different from that shown in Figs. 3 and 4, in that it is not equipped with extra return-spring contacts 25 and 28. On the other hand, switch 7a is provided with an extra contact, of the type that requires to be switched on and off, worked by the normal run of the operating knob 13. As can be seen in Fig. 2, this extra contact is made up of the terminal 24f which, in the first form of execution, was not connected to any lead. The working of this particular installation is as follows:

In position I of the switch 2, certain electrical apparatuses of the vehicle are supplied with current, in particular the horn.

In position II of the switch 2, the parking lights 4 are supplied with current and, depending on the position of part 19 of foot switch 7a, the headlamps 5 can also be supplied with current from the terminal 24f. The position of part 19, shown in Fig. 2, corresponds exactly to the simultaneous supply of current to the parking lights 4 and headlamps 5, switch 2 being in position II. It is therefore possible in position II to switch from the parking lights 4 to the head lamps 5, for the purpose of optical signalling simply by pressing on knob 13.

In position III of switch 2, the parking lights are always on, as well as either the headlamps 5 or the anti-dazzle lamps 6, depending on whether part 19 is in contact with terminal 24f or 24e, the supply of current to the anti-dazzle lamps 6 coming from this terminal 24e.

In position III of the switch 2, it is possible therefore with knob 13 to obtain the same result as with the already known installations.

Naturally a variant of this second form of execution would be to provide switch 7a with an extra contact 28 of the same sprung segment type, making it possible to supply current to the horn 3 at the end of the run of knob 13 for any position of switch 2. This variant has been represented by means of dotted lines in Fig. 2.

Another variant of this second form of execution would be to invert the position in the diagram of headlamps 5 and anti-dazzle lamps 6, so that in position II of switch 2, optical signalling could be carried out by supplying current to the anti-dazzle lamps 6 and not the headlamps 5 as is the case in the layout represented in Fig. 2.

The different forms of execution described above have all been considered as being operated by a foot switch of the rotary type. However, quite obviously this foot switch could be of any known type provided one or more extra contacts have been added.

It is to be noted that an ordinary switch could for example be fitted with a single contact of the return-spring type, like contact 28, so as to enable the horn to be worked in the three positions of the hand switch 2. Furthermore it would also be possible, in all the forms of execution provided with a contact similar to contact 28 for the supplying of current to the horn 3, to introduce into the horn circuit a hand switch fitted, for example, on the instrument panel of the vehicle and making it possible to eliminate the possibility of working the horn accidentally with the foot when driving by night for example.

Such a hand switch would be particularly advisable when an extra contact similar to the contact 25, worked at the beginning of the run of knob 13, is used for the supply of current to the horn.

Fig. 5 shows a diagram which makes it possible to eliminate the possibility of sounding the horn by mistake when driving by night. On the whole, this diagram is similar to that of Fig. 1, except that in this case contact 28 is combined with contact 25. In this third form of execution, the contact segment 25 is intended to connect electrically three terminals 30, 31 and 32 in the first part of the run of knob 13. Fig. 6 shows a switch similar to that of Fig. 3, modified to make it possible to make this connection between terminals 30, 31 and 32.

Terminal 32 is connected to the circuit of the parking lights 4.

Terminal 30 is connected to a terminal of the horn 3, the other terminal of which is connected to the source of current 1 of the vehicle. Terminal 31 is connected to the circuit of the anti-dazzle lamps 6.

When switch 2 is in position I, it can be seen that by pressing lightly on knob 13 of the foot switch, the extra contact is closed and the terminals 30, 31 and 32 are connected. The horn 3 works, for it is connected up between the source of current 1 and the earth by the filaments of the anti-dazzle lamps 6 and the parking lights 4. As these lamps are designed to absorb a much stronger current than that of the horn, the drop in voltage of these lamps is very small, so that the horn works normally and the filaments of the lamps do not become overheated. In the usual types of installation, there is often a relay for closing the horn contact and, in such a device, it is the exciting coil of this relay that is connected between the terminal 30 and a pole of the battery 1, instead of the horn 3 as shown. The consumption of current by the relay is generally between 1 and 2 watts, whereas the total consumption of the two anti-dazzle lamps and all the parking lights is as a general rule in the neighbourhood of one hundred watts. It can be seen that the resistance introduced into the relay circuit by the filaments of the lamps is quite negligible.

When switch 2 is in position II and the driver operates the foot switch to close the extra contact, it can be seen that the horn cannot work, for its two terminals are connected to the same pole of the battery. On the other hand, the connection made between the segment 25 and the terminal 31 causes current to be supplied to the anti-dazzle lamps 6 while the extra contact is closed, thus allowing optical signals to be made. When switch 2 is in position III, the horn 3 can still not be worked by the extra contact, since its two terminals are connected to the same pole of the battery.

Naturally another extra contact could be provided, for example in the form of a push button fitted to the instrument panel of the vehicle, to enable the horn to be used even when driving by night if required, that is to say in positions II and III of switch 2.

On the other hand, it is obvious that terminal 31 could be connected to the circuit of the headlamps 5 instead of to that of the anti-dazzle lamps 6. The extra contact could obviously be arranged differently on the foot switch and at least some of the terminals 30 to 32 could be attached in particular to the switch cover (not shown), which could be made of some insulating material.

I claim:

1. A multi-contact rotary foot switch adapted for use in a multi-circuit vehicle illumination and sound signalling system, comprising, in combination, a casing, a hollow cylindrical body integral with and extending from said casing, a spring-loaded rod positioned in said hollow casing, an operating knob means slidably mounted about the top portion of said hollow body in contact with the top portion of said spring-loaded rod for actuating said rod, a slotted member connected to said rod at its lower portion, said slotted member being positioned within said casing, an axle member positioned transversely within said casing and in said slot of said slotted member, a first multi-armed member fixedly secured on said axle member, a disc member rotatably mounted on said axle member, said disc member having a single peripheral slot, said multi-armed member being spaced from said disc member, a second multi-armed member positioned on said disc member, a single arm of said first multi-armed member engaging said disc member at said single peripheral slot of said disc member, stop means fixedly secured to said slotted member for engaging an arm of said multi-armed member, at least one insulated finger member fixedly secured to said slotted member at the top portion thereof, a return-spring contact member fitted in said casing, and a fixed contact member fixedly secured to and insulated from said casing, whereby said slotted member moves downwardly upon actuating of said operating knob, whereby said stop means engages one arm of said multi-armed member thereby causing said member to rotate, whereby said disc and said second multi-armed member will be caused to rotate on said axle, and whereby said finger member will actuate said return-spring contact member to complete an electrical circuit with said fixed contact member.

2. The multi-contact rotary foot switch of claim 1 including a non-insulated finger member fixedly secured to said slotted member at the top portion thereof, and a return-spring contact member fixedly secured to and insulated from said casing, whereby said non-insulated finger member will actuate said latter return-spring member to complete an electrical circuit.

References Cited in the file of this patent

UNITED STATES PATENTS

| | | |
|---|---|---|
| 1,172,713 | Hutchison | Feb. 22, 1916 |
| 2,361,204 | Hollins et al. | Oct. 24, 1944 |
| 2,458,323 | Volker | Jan. 4, 1949 |
| 2,523,170 | Wickerham | Sept. 19, 1950 |
| 2,656,426 | Dibelka | Oct. 20, 1953 |
| 2,673,906 | Butler | Mar. 30, 1954 |
| 2,690,481 | Courtney | Sept. 28, 1954 |
| 2,731,584 | Onksen | Jan. 17, 1956 |

FOREIGN PATENTS

| | | |
|---|---|---|
| H 17,539 | Germany | Oct. 25, 1956 |